United States Patent
Plantan et al.

(10) Patent No.: US 9,022,179 B2
(45) Date of Patent: May 5, 2015

(54) ROTARY LEVER DISC BRAKE CALIPER WITH RACK AND PINION MECHANISM

(71) Applicant: Bendix Spicer Foundation Brake LLC, Elyria, OH (US)

(72) Inventors: Ronald S. Plantan, Mooresville, NC (US); Dennis A. Wolf, Westlake, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/047,417

(22) Filed: Oct. 7, 2013

(65) Prior Publication Data

US 2015/0096847 A1 Apr. 9, 2015

(51) Int. Cl.
*F16D 125/24* (2012.01)
*F16D 65/18* (2006.01)
*F16D 125/22* (2012.01)

(52) U.S. Cl.
CPC .............. *F16D 65/18* (2013.01); *F16D 65/183* (2013.01); *F16D 2125/22* (2013.01); *F16D 2125/24* (2013.01)

(58) Field of Classification Search
CPC .............. F16D 65/183; F16D 2125/20; F16D 2125/22; F16D 2125/24
USPC ......... 188/72.1, 72.3, 72.9, 73.34, 72.7, 72.8, 188/73.46
See application file for complete search history.

(56) References Cited

U.S. PATENT DOCUMENTS

| | | | |
|---|---|---|---|
| 1,799,422 A | 4/1931 | Hoover | |
| 1,805,190 A | 5/1931 | Semmes | |
| 2,096,854 A * | 10/1937 | Kolarovic | ..................... 188/337 |
| 2,616,527 A | 11/1952 | James, Jr. | |
| 3,029,907 A | 4/1962 | Farnworth | |
| 3,664,469 A | 5/1972 | Maurice | |

(Continued)

FOREIGN PATENT DOCUMENTS

| | | | |
|---|---|---|---|
| DE | 464562 C1 * | 8/1928 | ................ B07B 4/02 |
| DE | 40 32 886 A1 | 4/1992 | |

(Continued)

OTHER PUBLICATIONS

International Search Report (PCT/ISA/210) dated Dec. 30, 2014 (two (2) pages).

(Continued)

*Primary Examiner* — Thomas Irvin
(74) *Attorney, Agent, or Firm* — Crowell & Moring LLP

(57) ABSTRACT

A rotary lever disc brake actuating mechanism and a method for operating the rotary lever disc brake mechanism is provided. The mechanism includes a rotary lever which rotates a pinion to further rotate brake pad application racks. The racks are arranged to rotate toward an inboard brake pad to advance the brake pad toward a brake disc. The racks may further cooperate with lateral pins fixed to an outboard portion of the brake such that the outboard portion simultaneously advances an outboard brake pad toward the brake disc when the racks rotate. The brake mechanism may be assembled into a cartridge to be placed within an inboard portion of a brake caliper. The brake caliper may be located on a caliper mount via adjustment pins, whereby during new brake pad installation the caliper is self-centered by application of the brake, followed by securing the caliper to the adjustment pins.

17 Claims, 4 Drawing Sheets

(56) References Cited

U.S. PATENT DOCUMENTS

| | | | |
|---|---|---|---|
| 4,442,930 A * | 4/1984 | Montalvo, Sr. | 192/85.09 |
| 4,442,931 A * | 4/1984 | Montalvo, Sr. | 192/85.09 |
| 4,809,824 A | 3/1989 | Fargier et al. | |
| 4,850,459 A | 7/1989 | Johannesen et al. | |
| 5,385,218 A | 1/1995 | Migliori | |
| 5,913,390 A | 6/1999 | Hostetler | |
| 5,927,445 A * | 7/1999 | Bieker et al. | 188/72.9 |
| 6,119,822 A | 9/2000 | Baldwin | |
| 6,354,407 B1 * | 3/2002 | Heinlein et al. | 188/71.1 |
| 6,830,141 B1 | 12/2004 | Neelakantan et al. | |
| 7,182,181 B2 | 2/2007 | Severinsson | |
| 7,240,773 B2 * | 7/2007 | Baumgartner | 188/71.9 |
| 7,374,026 B2 * | 5/2008 | Taylor et al. | 188/71.9 |
| 7,591,350 B2 * | 9/2009 | Bieker et al. | 188/72.9 |
| 7,673,722 B2 * | 3/2010 | Linke | 188/72.9 |
| 7,708,122 B2 | 5/2010 | Plantan et al. | |
| 8,312,974 B2 * | 11/2012 | Kim | 188/72.8 |
| 2005/0139435 A1 | 6/2005 | Jelley et al. | |
| 2005/0258006 A1 | 11/2005 | Plantan et al. | |
| 2008/0289922 A1 | 11/2008 | Hofmann et al. | |

FOREIGN PATENT DOCUMENTS

| | | | |
|---|---|---|---|
| FR | 1470079 A * | 2/1967 | F16D 65/18 |
| KR | 2003-0093690 A | 12/2003 | |

OTHER PUBLICATIONS

Written Opinion (PCT/ISA/237) dated Dec. 30, 2014 (six (6) pages).

* cited by examiner

ROTARY LEVER DISC BRAKE CALIPER WITH RACK AND PINION MECHANISM

BACKGROUND AND SUMMARY OF THE INVENTION

The present invention relates to disc brakes for vehicles, and in particular to a brake application arrangement for generating braking forces in disc brakes such as air-operated disc brakes utilized on commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German Patent Publication No. DE 40 32 886 A1, and in particular FIG. 1 of this document, discloses an example of such an air disc brake. In this design, a pneumatic diaphragm chamber (pneumatic actuator) is attached to a rear face of the disc brake caliper housing, and applies a brake actuation force through a linear actuator rod to a brake actuator lever within the caliper. The brake's actuator lever in turn transfers and multiplies the force applied by the actuator rod to one or more spindles, thereby advancing brake pads against a brake disc or rotor. The terms "brake disc," "rotor" and "brake rotor" are used interchangeably herein.

As shown in FIG. 1 of DE 40 32 886 A1, the actuator is located inboard of the brake caliper and the brake application mechanism within the caliper must be carefully arranged to have as short a height in the radial direction as possible. This is in large part because the amount of clearance between the brake caliper and the wheel rim is very tight due to commercial vehicle wheel rims in the having been sized in the past to only provide adequate clearance for the drum-type brakes historically employed on such vehicles, and because the maximum use of the available space within the wheel rim envelope permits greater brake performance to be obtained using larger brake discs.

A widely-used brake application mechanism a rotary lever arrangement such as shown in prior art FIG. 1, in which the brake actuator's operating rod 10 engages a cup at the upper end of a rotary lever 9, such that when the operating rod 10 is extended toward the rotary lever 9 (i.e., in the brake application direction) the rotary lever 9 rotates about an eccentric bearing arrangement 8 to cause brake application spindles or pistons 14 to advance a brake pad 19 toward the brake disc 1 to apply the brake. This common brake application mechanism is used in part because it can transmit the brake actuator's brake application force to the brake pad using a mechanism which is low enough in height to fit within the wheel rim envelope, while also multiplying the brake application force on the order of 15-20 times, thereby minimizing the needed brake actuator and related component sized and the necessary pneumatic pressure which must be applied to the actuator while still generating sufficiently high brake pad application forces to effectively slow the vehicle.

While the conventional rotary lever brake application mechanism has proven highly effective, their design and operation is relatively complicated (for example, high machined parts count, need to include wear adjusting devices to compensate for pad wear, etc.), and the high leverage ratios and relatively space-constrained caliper volumes result in very high component stress loadings in several locations which may adversely affect brake component design life, wear and long-term reliability.

The present invention is directed to an innovative brake application mechanism which addresses these and other issues in the prior art, while providing a robust and mechanically less complicated arrangement. In an embodiment of the present invention, the rotary lever is not supported on an eccentric bearing arrangement, but is connected to a cylindrical pinion having an axis of rotation perpendicular to the axis of rotation of the brake disc. When the rotary lever is pressed toward the brake disc by the brake actuator, the pinion rotates about its cylindrical axis. The pinion is provided with gear teeth at the opposing ends of the pinion cylinder which engage corresponding gear teeth of opposing brake pad application racks. When the rotary lever is pressed forward by the brake actuator's operating rod, the brake application mechanism's rack-and-pinion mechanism advances the opposing racks' brake pad contact faces toward the brake disc to press the inboard brake pad against the brake disc. The brake pad application racks may be generally circular in shape, and pivot about fixed rotation axes which are parallel to the brake disc and perpendicular to the axis of rotation of the pinion. The gear teeth of the racks need only extend around the portion of a circle corresponding to the range of rack rotation that would be generated by the full range of rotation of the pinion. The gear teeth may also be beveled so that the axes are aligned to prevent gear binding.

The present invention may also include a mechanism which, simultaneous with the advancing of the inboard brake pad toward the brake disc, draws the portion of the brake caliper holding the outboard brake pad toward the brake disc in order to equally and precisely displace both brake pads toward and away from the brake disc. Such a mechanism may include the outer portion of the brake caliper (aka, the outboard caliper arm) being a floating arm, i.e., a component which is slidably displaceable relative to the inboard portion of the brake caliper, and having a guide pin which interacts with at least one of the brake application mechanism's racks. Preferably the outboard portion of the caliper is provided with two guide pins having gear teeth along their lengths which engage corresponding gear teeth on the inboard racks. As the rotary lever is advanced and the racks advance the inboard brake pad toward the brake disc, the guide pins are simultaneously drawn by the racks to pull the outboard portion of the caliper and its outboard brake pad toward the opposite side of the brake disc an equal amount. The brake caliper is preferably installed in a matter which centers the brake disc between the inboard and outboard brake pads to minimize the potential for uneven application of brake pad pressure to the sides of the brake disc and consequent uneven brake pad wear, but may also be configured to accommodate a floating brake disc, i.e., a brake disc which is slidable along its axis of rotation such that the brake disc self-centers between the inboard and outboard brake pads to achieve the same objectives.

The brake application mechanism of the present invention assists in providing even brake pad wear, lowers brake caliper weight and greatly simplifies brake manufacture, assembly and maintenance in a very robust design. One of the advantages of this rack-and-pinion design is that there may be an opportunity to eliminate the prior art's costly and complicated precision wear adjustment mechanisms from the brake caliper (especially for hydraulic actuation). In addition to the cost savings, elimination of such adjusting mechanisms would also eliminate a source of undesired brake mis-adjustment caused by vibration-induced micro-motion of the adjusters.

The present invention also permits the use of a stationary caliper chamber and fixed-location rack and pinion components, thereby eliminating complex multi-component brake application mechanism assemblies which must be assembled outside of the caliper, arranged to remain assembled while being installed in the caliper, and still capable of having the entire assembly move toward/away from the brake disc during brake operation. The mechanism also may be installed as a one piece cartridge. Intent is to no longer need the sliding caliper. The stationary inboard portion of the brake caliper, with only the outboard caliper arm having to move toward or away from the brake disc permits simpler, lower cost and fewer-part caliper mounting arrangements, in part by eliminating the need to provide sliding caliper mounting arrangements. For example, the inboard portion of the caliper may be mounted in a fixed manner to the brake caliper mount, eliminating the need for precision-formed floating caliper mounting pins and bushings and their associated lubrication and environmental protection requirements.

A further advantage of the inventive rack-and-pinion brake application mechanism approach is the ability to precisely control the amount of brake application and retraction of both sides of the brake pad pair, lessening the potential for one or both of the brake pads to continue to apply a parasitic brake pad drag following release of the brake by the driver.

The rack-and-pinion rotary lever brake application mechanism design further has the advantage of being suitable for use of a variety of brake actuators, including pneumatic, electric and hydraulic actuators, as long as the brake application forces generated by the chosen actuator and the gearing ratios of the rotary lever arm, pinion and rack gearing permit the actuator to apply the desired amount of brake pad application force to the brake disc to obtain the desired braking performance at the wheel.

The present rack-and-pinion rotary lever design is not limited to circular or linear racks and/or pinions. For example, the racks and the pinion may be arranged as linear or other non-circular components, such as elliptical racks with a corresponding pinion profile to provide non-linear brake pad application in response to the motion of the rotary lever.

Other objects, advantages and novel features of the present invention will become apparent from the following detailed description of the invention when considered in conjunction with the accompanying drawings.

DETAILED DESCRIPTION OF THE DRAWINGS

Figure 1:
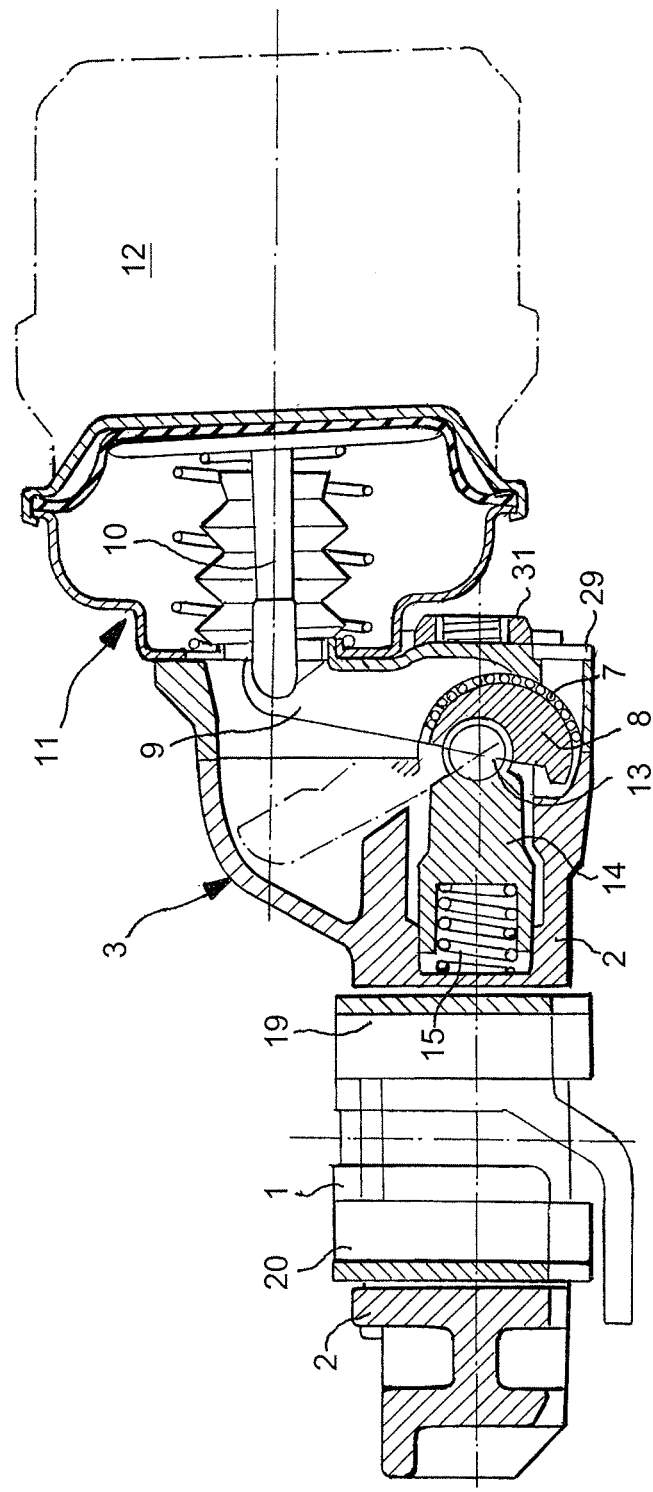
FIG. 1 is an illustration of a prior art brake caliper having a conventional rotary lever brake actuation mechanism

In FIGS. 2-5 the reference label number does not correspond to the numbering in prior art FIG. 1. Common reference label numbers are used with common features in FIGS. 2-5.

Figure 2:
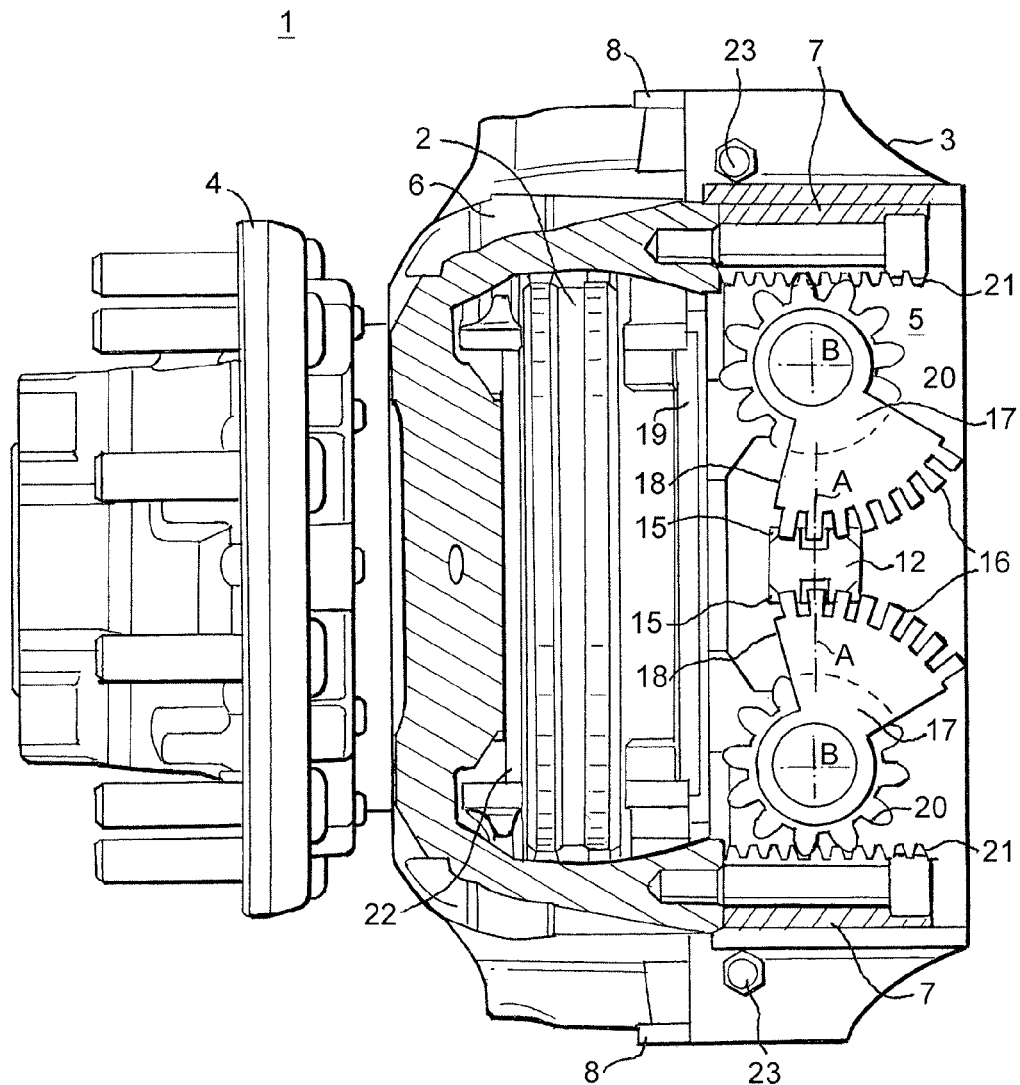
FIG. 2 is a plan view of a rack-and-pinion rotary lever disc brake in accordance with an embodiment of the present invention.

FIG. 2 shows a plan view of a disc brake 1 of a commercial vehicle in accordance with an embodiment of the present invention. Some components of the brake caliper not necessary for an understanding of the present invention are not included in FIGS. 2 and 3 to permit more clear illustration of several of the features of the rack-and-pinion rotary lever disc brake.

In FIG. 2 the disc brake 1 of a commercial vehicle is shown with a brake disc 2 rotationally fixed to an axle hub 4 on which a vehicle wheel (not illustrated) may be mounted. A brake caliper 3 straddles the brake disc 2. The caliper 3 includes an inboard caliper portion 5 and an outboard caliper portion 6 (also referred to as the outboard arm), shown in partial cross-section. The outboard arm 6 is located on sliding pins 7, which are secured to the outboard caliper portion 6 in this embodiment by fasteners (not illustrated). The outboard caliper portion 6 may be moved toward, and away from, the inboard caliper portion 5 by drawing the pins 7 toward, and away from, the inboard caliper portion 5. In this way the pins 7 function as outboard brake pad advancing portions, arranged to advance the outboard caliper portion toward and away from the brake disc 2.

Figure 3:
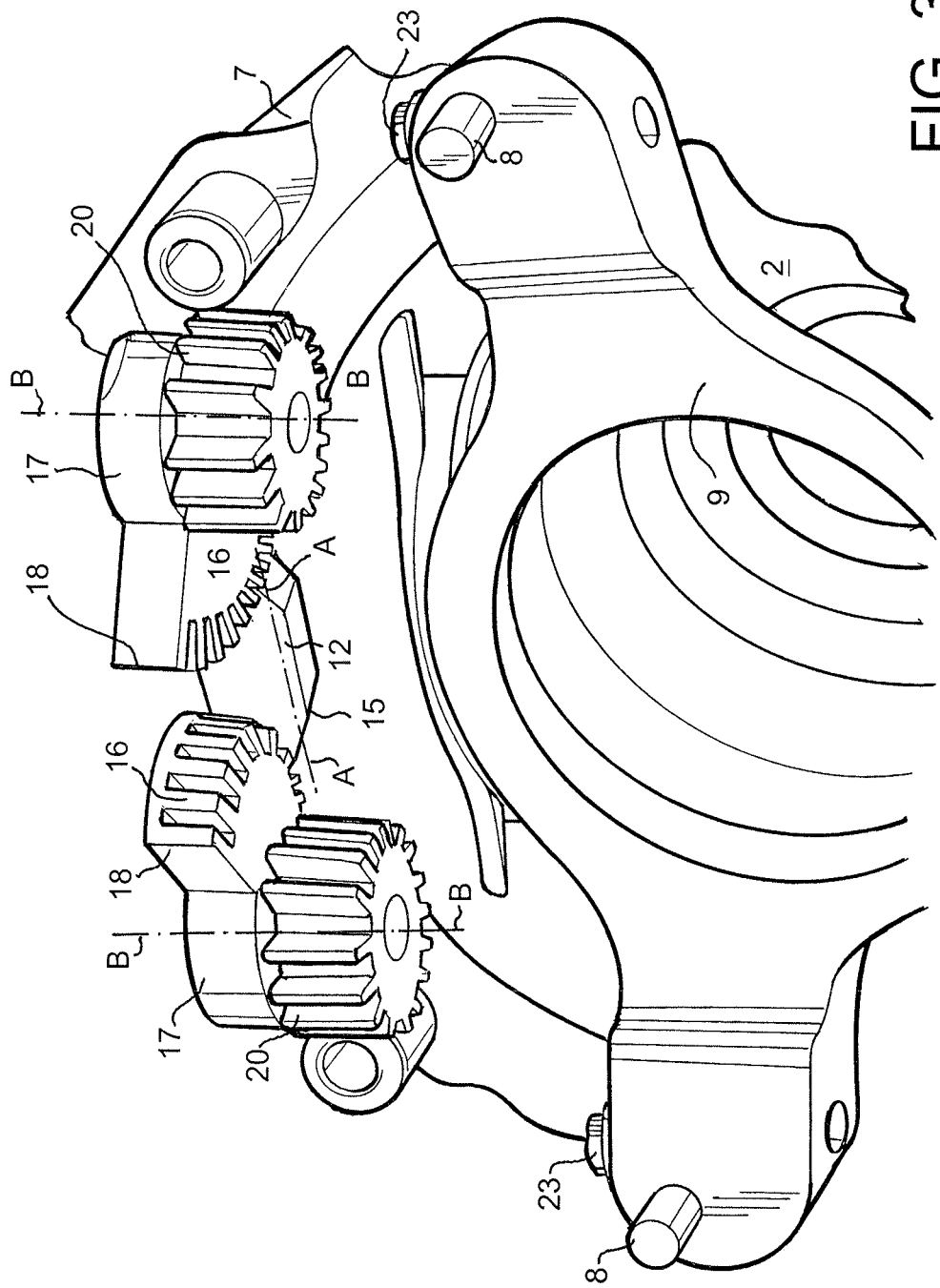
FIG. 3 is an oblique bottom view of the rack-and-pinion rotary lever disc brake of FIG. 2.

As may be seen in FIG. 2 and the FIG. 3 view of the caliper looking obliquely upwards from the inboard side of the brake, the inboard portion 5 of the caliper 3 is mounted in this embodiment in a fixed manner, clamped on guide pins 8 to a caliper mount 9, which in turn is fixed to the vehicle axle (not illustrated for clarity).

The inboard portion of the brake caliper 5 includes a brake application mechanism which includes a rotary lever 10. The rotary lever 10 has an actuator receiving end 11 which is configured to accept an end of a brake actuator operating rod (not illustrated), and a pinion 12 at the opposite end of the rotary lever 10. The pinion 12 is located in the inboard caliper portion 5 on an axis of rotation A-A such that the pinion 12 rotates about axis A-A when the actuator receiving end 11 of the rotary lever 10 is advanced toward the brake disc 2. The pinion 12 has at the ends of its generally cylindrical body gear teeth 15 which engage corresponding gear teeth 16 of rotating racks 17. The racks 17 are rotationally located on axes B-B which are generally perpendicular to pinion axis A-A, and in this embodiment have the gear teeth 16 disposed over only a portion of the periphery of the racks.

The racks 17 are arranged such that as the rotary lever 10 (visible in FIGS. 4 and 5) is pressed toward the brake disc 2, the corresponding rotation of pinion 12 causes outboard-facing portions 18 of the rack teeth 16 to advance, pressing inboard brake pad 19 toward the inboard face of the brake disc 2. The outboard-facing portions 18 of the rack teeth 16 may be positively connected to the backing plate of the brake pad 19 to ensure the inboard brake pad may be reliably advanced and retracted from the brake disc 2.

Figure 4:
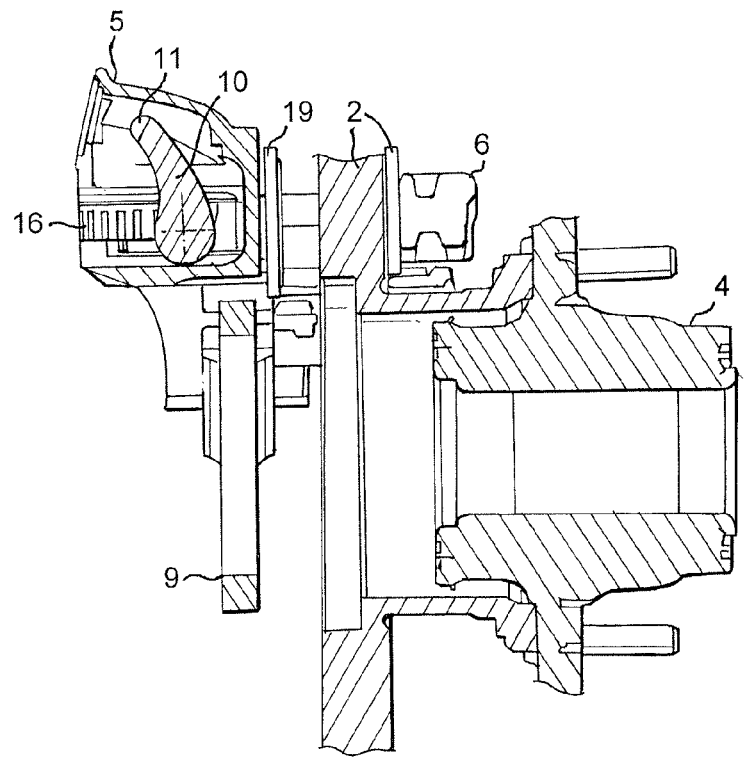
FIG. 4 is an elevation cross-sectional view of the rack-and-pinion rotary lever disc brake of FIG. 2.
Figure 5:
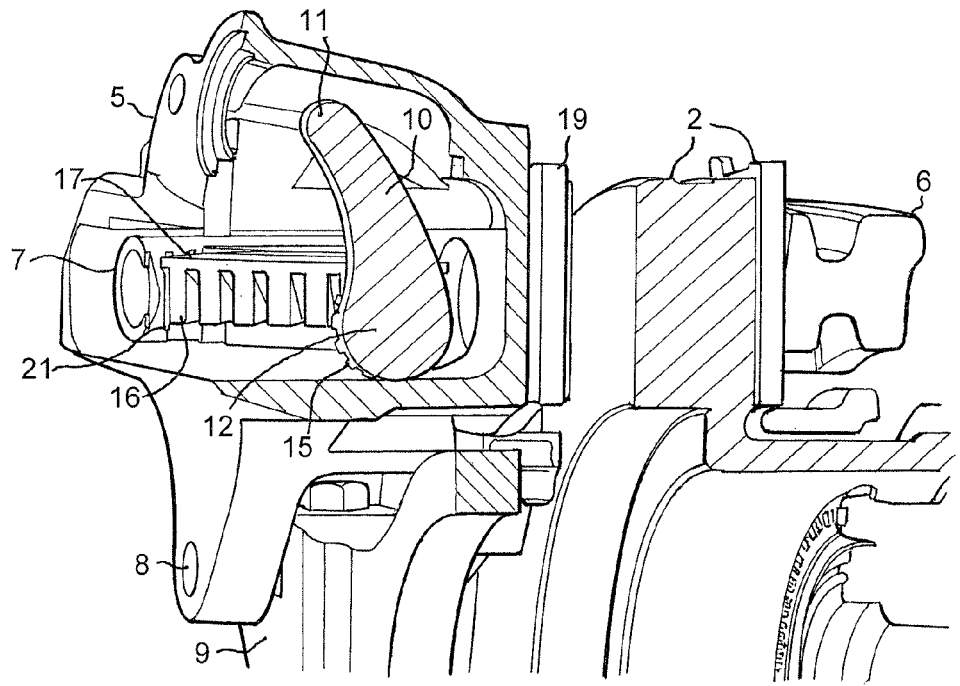
FIG. 5 is an oblique elevation view of magnified portion of the rack-and-pinion rotary lever disc brake of FIG. 4.

The racks 17 may also be configured with pin-driving gear teeth 20. In this embodiment the pin-driving teeth 20 are positioned about a lower projection of the racks 17, and are also arranged to rotate about the racks' respective axes B-B. The pin-driving teeth are arranged to mesh with corresponding gear teeth 21 on the pins 7. Preferably, the gearing ratios of the gear teeth 15/16 and the pin-driving gear teeth are the same, so that as the inboard brake pad 19 is advanced toward the brake disc 2 by operation of the rotary lever 10, the outboard caliper portion 6 is drawn toward the outboard side of the brake disc 2 simultaneously the same distance. As a result, the outboard brake pad 22 is advanced by the outboard arm 6 gear toward the brake disc 2 synchronously with the advance of inboard brake pad 19. Preferably, the rack-and-pinion and outboard caliper portion pin gearing are arranged with generally in-plane gearing as shown in FIGS. 4 and 5, thereby minimizing out-of plane reaction forces and permitting the overall brake caliper height to be kept to a minimum.

As may be observed in the figures, the brake pads 19, 22 are illustrated here with only a small portion of their brake pad material on their respective backing plates, in order to improve clarity in the figures.

In the illustrated embodiment the brake disc 2 is a non-sliding unit which is fixed to the hub 4. During installation of new brake pads, the brake caliper 3 is aligned with the brake disc 2 by loosening clamp-securing fasteners 23, applying the brake in order to permit the brake caliper 3 to slide axially on pins 8 in caliper mount 9 to self-center the caliper on the brake disc 2, tightening the clamp-securing fasteners 23, and releasing the brake.

An alternative embodiment would arrange the rack-and-pinion caliper on its caliper mounting plate via a sliding caliper mount, thereby permitting the brake caliper 3 to self-center over the brake disc 2 on each application of the brake, with or without having the outboard caliper portion 6 being drawn toward the brake disc 2 via the racks 17 traveling along the displaceable pins 7.

An advantage of the present rack-and-pinion rotary lever disc brake is that upon release of the brake application mechanism, the positive engagement of the pin-driving gear teeth 20 and the pinion-rack gear teeth 15, 16 causes both the inboard and outboard brake pads 19, 22 to be positively withdrawn simultaneously the same distance from both sides of the brake disc 2, helping ensure the inner and outer brake pads experience equal loading and equal wear. Further, because the adjustment mechanism works for both sides, only one adjustment mechanism need be used, and because the adjustment is mounted centrally there are less vibration-induced misadjustment effects and thus no need to synchronize two sides for movement of brake pads. The central fixing of the caliper also reduces the effects of externally-applied forces, such as movement due to tension applied by hoses which influence the alignment of a sliding caliper.

A further advantage of the present rack-and-pinion rotary lever brake approach is potential to eliminate the prior art's need for precision-machined and mechanically complicated wear adjusters to compensate for brake pad wear. In prior art rotary lever disc brakes, the combination of the leverage ratio needed to generate sufficient brake pad application force and the limited space available to accommodate the "swing" or travel of the rotary lever resulted in brake application mechanisms within the caliper which could not provide sufficient lateral displacement of the brake pads over the entire operating range from new pad thickness to end-of-life pad thickness. As a result various brake pad wear-compensating adjustment devices have been included in the prior art rotary lever disc brakes, typically a complicated apparatus with one-way clutch features and various means of manually withdrawing the wear adjusters when brake pads are replaced in order to allow the new brake pads to be inserted into the brake. By appropriately sizing the diameter of the pinion 12 and the length of the rotary lever, the present rack-and-pinion rotary lever brake application mechanism may be arranged to ensure coverage of the entire required span of brake pad thicknesses without the need for additional wear adjusting devices.

While the present rack-and-pinion rotary lever disc brake may eliminate the need for inclusion of brake pad wear adjusters, if desired wear adjusting mechanisms may be incorporated. For example, mechanisms which incrementally advance the racks 17 (and by their intermeshed gear teeth, pins 7 and outboard caliper portion 6) relative to the pinion 12. Such mechanisms are known in the art, and thus are not discussed in further detail.

The racks and pinion may be assembled as individual components onto supporting fixtures within the inboard caliper portion 5, or may advantageously be assembled in to a rack-and-pinion actuator cartridge suitable for insertion as a unit into the inboard portion of the caliper, either with the outboard caliper portion 6's pins 7 already engaged with the rack teeth 20, or separate from the outboard caliper portion 6.

The foregoing disclosure has been set forth merely to illustrate the invention and is not intended to be limiting. For example, rather than using racks which have circular gear teeth arrangements, the racks may be configured as linear racks, or non-circular curved sections having corresponding non-uniform gear teeth on the pinion to permit alteration of the linearity of the brake pads' advance toward and retraction from the brake disc. As another example, the racks may be located on the inboard caliper portion housing in a variety of ways, such as over bushings fixed to the roof of the interior surface of the caliper housing, or by suspending them from the top of the caliper housing interior by fasteners which penetrate the top surface of the housing, or supported on bushings or pins rising from the floor of the interior of the caliper housing. Nor is the present rack-and-pinion brake application mechanism limited to disc brake applications, but may be applied to any brake using a rotary lever mechanism. Because other such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 disc brake
2 brake disc
3 brake caliper
4 axle hub
5 inboard caliper portion
6 outboard caliper portion
7 pin
8 guide pin
9 caliper mount
10 rotary lever
11 rotary lever actuator receiving end
12 pinion
15 pinion gear teeth
16 rack gear teeth
17 rack
18 outboard-facing portion of rack gear teeth
19 inboard brake pad
20 pin-driving teeth
21 pin gear teeth
22 outboard brake pad
23 clamp-securing fastener

What is claimed is:
1. A rotary lever disc brake, comprising:
a brake caliper configured to straddle a brake disc; and a rack-and-pinion brake application mechanism located at least partially within the brake caliper and configured to advance an inboard brake pad into contact with the brake disc,
wherein
the brake caliper includes an inboard caliper portion configured to receive the rack-and-pinion brake application mechanism, and
the rack-and-pinion brake application mechanism includes
a rotary lever, the rotary lever being configured to receive a brake actuation force from a brake actuator at a brake actuation end of the rotary lever to advance a brake actuator end of the rotary lever toward the brake disc, a pinion rotatably located on an axis parallel to a friction surface of the brake disc and being connected to an end of the rotary lever opposite to the brake actuator end of the rotary lever, and at least one rack arranged to cooperatively engage the pinion, the at least one rack being rotatably located on an axis parallel to the friction surface of the brake disc and perpendicular to the pinion rotation axis, the at least one rack including an inboard brake pad advancing portion arranged to cooperate with the inboard brake pad to advance the inboard brake pad toward the brake disc.

2. The rotary lever disc brake of claim 1, wherein the brake caliper includes an outboard caliper portion arranged to advance an outboard brake pad toward the brake disc; and the at least one rack further includes an outboard brake pad advancing portion arranged to advance the outboard caliper portion and the outboard brake pad toward the brake disc when the at least one rack is actuated to advance the inboard brake pad toward the brake disc.

3. The rotary lever disc brake of claim 2, wherein the at least one rack includes two racks, and the two racks are arranged on opposing sides of the pinion in a manner permitting gear teeth on opposing ends of the pinion to engage gear teeth on the two racks.

4. The rotary lever disc brake of claim 3, wherein the two racks are configured to rotate about respective rack axes essentially parallel to the friction surface of the brake disc and essentially perpendicular to the pinion axis, and the rotary lever configured to receive a brake actuation force is at least one of integrally formed with and connected to the pinion such that when the rotary lever is displaced toward the brake disc, the pinion rotates about the pinion axis and cooperates with the two racks to rotate the racks toward the inboard brake pad to advance the inboard brake pad toward the brake disc friction surface.

5. The rotary lever disc brake of claim 1, wherein the at least one rack includes two racks, and the two racks are arranged on opposing sides of the pinion in a manner permitting gear teeth on opposing ends of the pinion to engage gear teeth on the two racks.

6. The rotary lever disc brake of claim 1, wherein the brake caliper is located on a brake caliper mount on at least one locating fixture arranged to permit adjustment of a distance between the inboard caliper portion and the brake disc.

7. The rotary lever disc brake of claim 6, wherein the brake caliper is configured to be fixed on the at least one locating fixture when the rotary lever disc brake is in use.

8. A brake application mechanism for a rotary lever disc brake, comprising:

a rack-and-pinion brake application mechanism configured to be located at least partially within a brake caliper configured to straddle a brake disc and to advance an inboard brake pad into contact with the brake disc, the rack-and-pinion brake application mechanism including:

a rotary lever configured to receive a brake actuation force from a brake actuator at a brake actuation end of the rotary lever to advance a brake actuator end of the rotary lever toward the brake disc, a pinion rotatably located on an axis parallel to a friction surface of the brake disc and being connected to an end of the rotary lever opposite to the brake actuator end of the rotary lever, and at least one rack arranged to cooperatively engage the pinion, the at least one rack being rotatably located on an axis parallel to the friction surface of the brake disc and perpendicular to the pinion rotation axis, the at least one rack including an inboard brake pad advancing portion arranged to cooperate with the inboard brake pad to advance the inboard brake pad toward the brake disc.

9. The brake application mechanism of claim 8, wherein the outboard caliper portion is arranged to advance an outboard brake pad toward the brake disc; and the at least one rack further includes an outboard brake pad advancing portion arranged to advance the outboard caliper portion and the outboard brake pad toward the brake disc when the at least one rack is actuated to advance the inboard brake pad toward the brake disc.

10. The brake application mechanism of claim 9, wherein the at least one rack includes two racks, and the two racks are arranged on opposing sides of the pinion in a manner permitting gear teeth on opposing ends of the pinion to engage gear teeth on the two racks.

11. The brake application mechanism of claim 10, wherein the pinion is arranged on a pinion axis essentially parallel to the friction surface of the brake disc, the two racks are configured to rotate about respective rack axes essentially parallel to the friction surface of the brake disc and essentially perpendicular to the pinion axis, and the rotary lever configured to receive a brake actuation force is at least one of integrally formed with and connected to the pinion in a manner such that when the rotary lever is displaced toward the brake disc, the pinion rotates about the pinion axis and cooperates with the two racks to rotate the racks toward the inboard brake pad to advance the inboard brake pad toward the brake disc friction surface.

12. The brake application mechanism of claim 8, wherein the at least one rack includes two racks, and the two racks are arranged on opposing sides of the pinion in a manner permitting gear teeth on opposing ends of the pinion to engage gear teeth on the two racks.

13. The brake application mechanism of claim 8, wherein the brake caliper is located on a brake caliper mount on at least one locating fixture arranged to permit adjustment of a distance between the inboard caliper portion and the brake disc.

14. A method of operating a rotary lever disc brake, comprising the acts of:

locating a brake caliper straddling a brake disc, wherein the brake caliper includes an inboard caliper portion configured to receive a rack-and-pinion brake application mechanism, the rack-and-pinion brake application mechanism being configured to advance an inboard brake pad into contact with the brake disc and including a rotary lever, the rotary lever being configured to receive a brake actuation force from a brake actuator at a brake actuation end of the rotary lever to advance a brake actuator end of the rotary lever toward the brake disc, a pinion rotatably located on an axis parallel to a friction surface of the brake disc and being connected to an end of the rotary lever opposite to the brake actuator end of the rotary lever, and at least one rack arranged to cooperatively engage the pinion, the at least one rack being rotatably located on an axis parallel to the friction surface of the brake disc and perpendicular to the pinion rotation axis, the at least one rack including an inboard brake pad advancing portion arranged to cooperate with the inboard brake pad to advance the inboard brake pad toward the brake disc;

operating the rotary lever to advance the inboard brake pad toward the brake disc.

15. The method of operating a rotary lever disc brake of claim 14, further comprising the acts of:

installing the inboard brake pad and an outboard brake pad in the rotary lever disc brake;

applying the rotary lever disc brake to center the rotary lever disc brake over the brake disc between the inboard brake pad and the outboard brake pad; and securing the brake caliper on a brake caliper mount against axial motion relative to a rotation axis of the brake disc.

16. The method of operating a rotary lever disc brake of claim 15, wherein the brake caliper includes an outboard caliper portion arranged to advance an outboard brake pad toward the brake disc, the at least one rack further includes an outboard brake pad advancing portion arranged to advance the outboard caliper portion and the outboard brake pad toward the brake disc when the at least one rack is actuated to advance the inboard brake pad toward the brake disc, and the act of operating the rotary lever to advance the inboard brake pad toward the brake disc also causes the outboard caliper portion to advance the outboard brake pad toward the brake disc.

17. The method of operating a rotary lever disc brake of claim 14, wherein the brake caliper includes an outboard caliper portion arranged to advance an outboard brake pad toward the brake disc, the at least one rack further includes an outboard brake pad advancing portion arranged to advance the outboard caliper portion and the outboard brake pad toward the brake disc when the at least one rack is actuated to advance the inboard brake pad toward the brake disc, and the act of operating the rotary lever to advance the inboard brake pad toward the brake disc also causes the outboard caliper portion to advance the outboard brake pad toward the brake disc.

\* \* \* \* \*